United States Patent [19]

Fournie

[11] 4,117,693
[45] Oct. 3, 1978

[54] PLACING CONDUITS ON THE SEA FLOOR BY HAULING AND CONTROLLED IMMERSION

[75] Inventor: Rene Fournie, Pau, France

[73] Assignee: Societe Nationale Elf Aquitaine (Production), Paris, France

[21] Appl. No.: 805,427

[22] Filed: Jun. 10, 1977

[30] Foreign Application Priority Data

Jun. 14, 1976 [FR] France .................... 76 17948

[51] Int. Cl.$^2$ ............................ F16L 1/00
[52] U.S. Cl. .................................. 405/171
[58] Field of Search ............. 61/107, 112, 109, 114, 61/105

[56] References Cited

U.S. PATENT DOCUMENTS

| | | | |
|---|---|---|---|
| 2,735,270 | 2/1956 | Collins | 61/112 X |
| 2,770,950 | 11/1956 | Collins | 61/112 |
| 2,981,074 | 4/1961 | Wilder | 61/107 X |
| 3,173,271 | 3/1965 | Wittgenstein | 61/112 X |

Primary Examiner—Jacob Shapiro
Attorney, Agent, or Firm—Brisebois & Kruger

[57] ABSTRACT

Process and equipment for laying on the ocean floor a pipeline for the transfer of liquids or gas. In this process, the pipeline is constructed in a staging or shallow water area where the pipe is equipped with separate buoyancy and handling means, the conduit is submerged, towed to a location vertically above the pipeline route, the conduit is raised to the surface for inspection and preparation, one resumes in a controlled fashion and completes the submersion and positioning on the ocean floor, and finally the buoyancy and handling means are recovered. This process, due to its use of buoyancy and handling devices, considerably lowers the installation cost of underwater pipelines.

4 Claims, 11 Drawing Figures

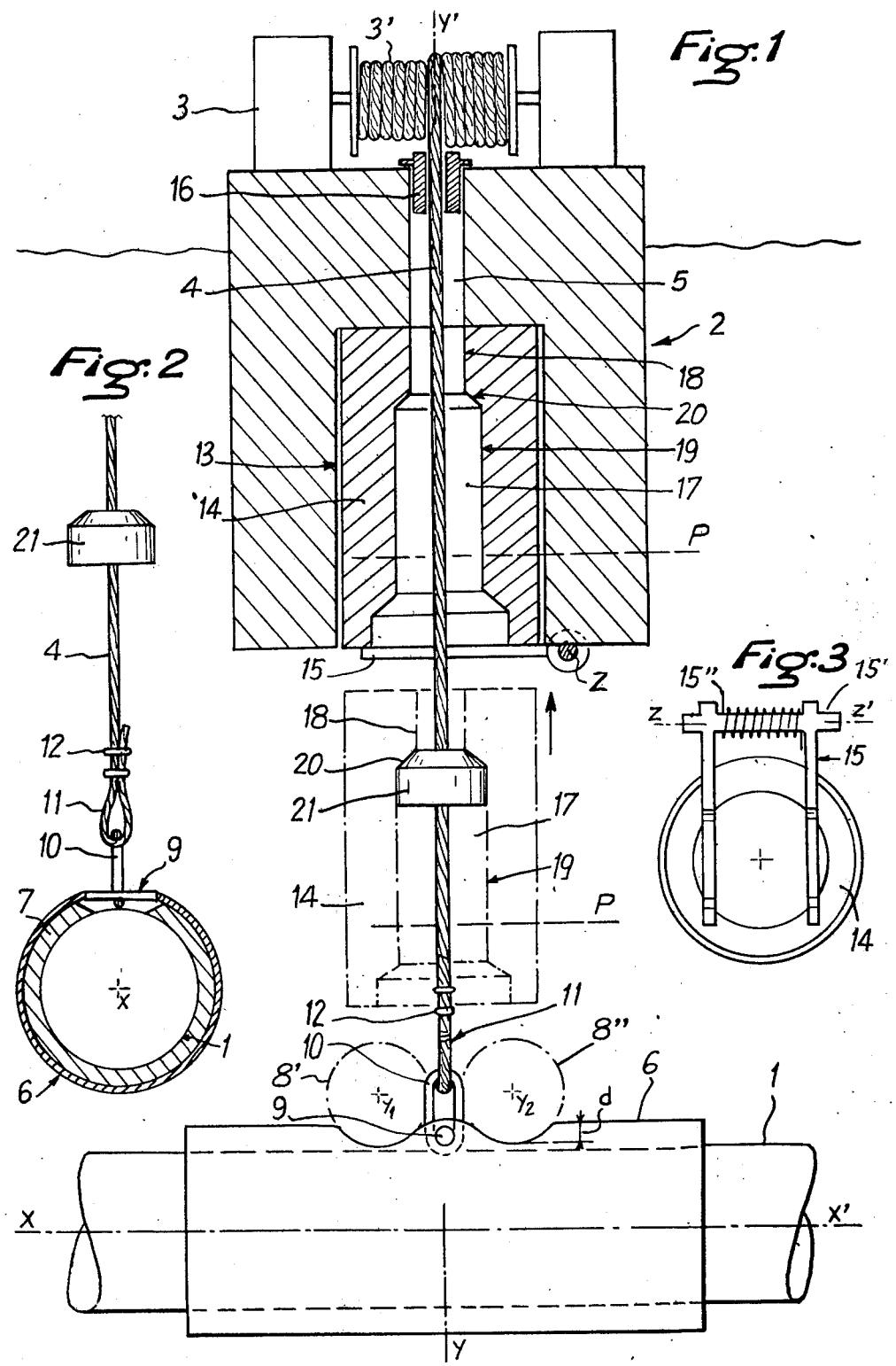

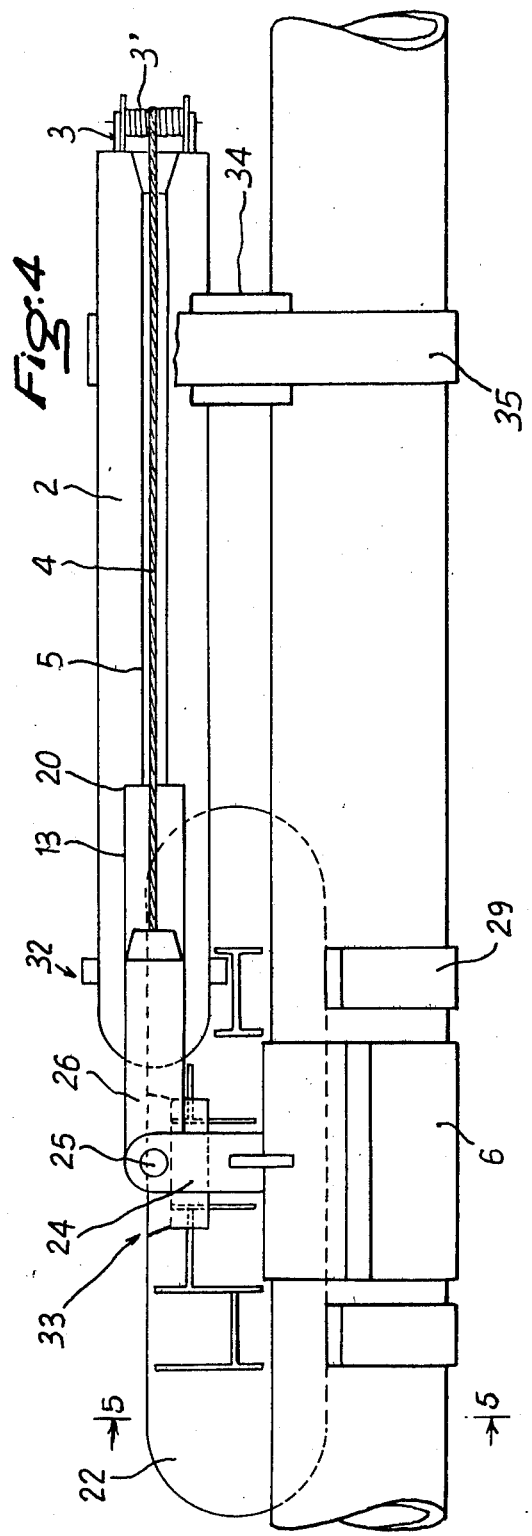
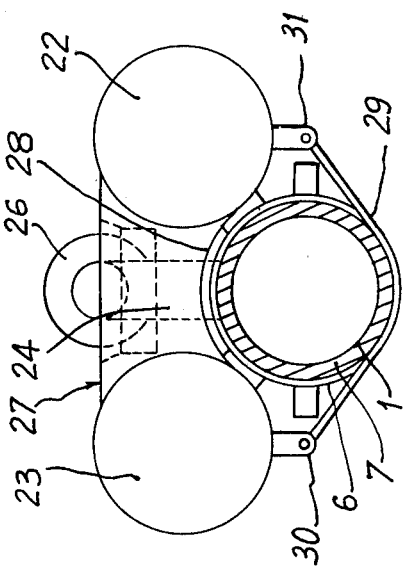

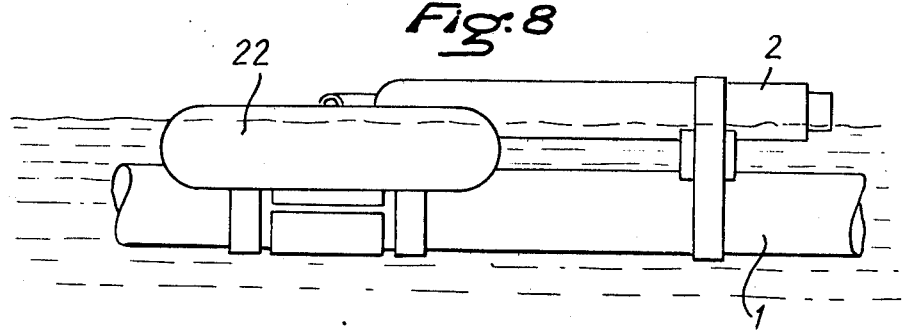
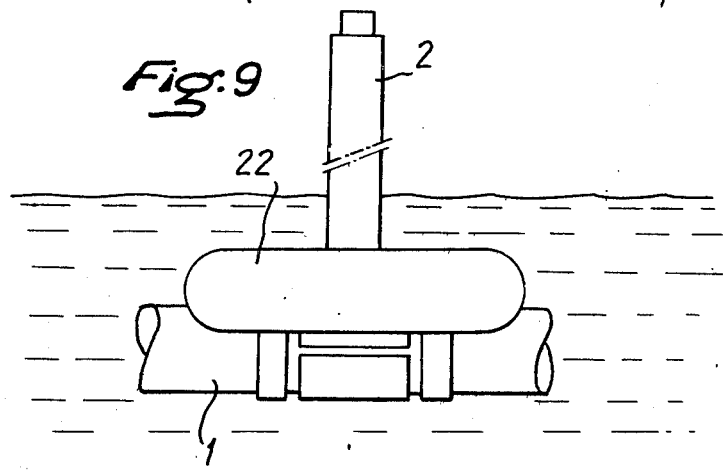
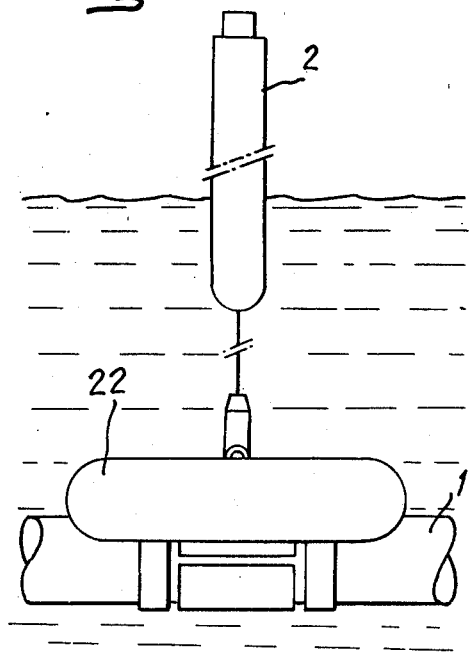
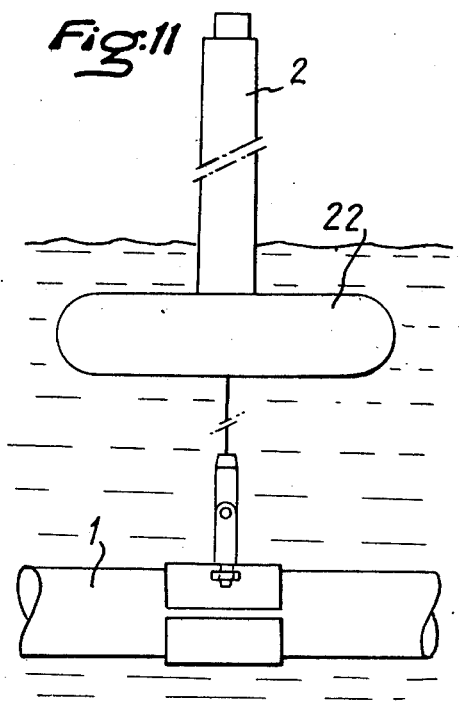

PLACING CONDUITS ON THE SEA FLOOR BY HAULING AND CONTROLLED IMMERSION

SUMMARY OF THE INVENTION

The invention relates to a process for towing and for placing or laying on the ocean floor a pipeline designed for the transfer of liquid or gaseous fluids and also relates to the apparatus for practicing the process.

The method according to the invention eliminates the need for transporting conduit sections to, and the construction of the pipeline at the site in open sea. The towing of a significant length of assembled pipeline can be done very safely in accordance with the invention since it is protected from the effects of surface wave action by maintaining the pipeline submerged during towing. The pipeline is eventually taken back up to the surface for a final check or servicing before laying it on the ocean floor.

Several different methods are known for the installation of pipelines on the sea floor. As the pipeline is designed for the transfer of gaseous or liquid fluids, especially gaseous or liquid hydrocarbons, special arrangements are adopted for the coating of the pipeline and for its being filled in the course of the operation. Whatever the subsequent use of the pipeline, it is possible to transport the sections of pipe and to join them on board a work vessel and then submerge the pipe using slings placed at the stern of the same vessel. It is possible, and in different ways, to construct substantial sections of the pipeline on land and to haul them by sea with the assistance of floats which are regularly distributed along the assembled pipeline and whose ballasting can vary.

In the first group of techniques, where the pipeline is assembled and immersed immediately after its construction, it is not subject to the hazards of surface conditions. However, holding the vessel steady on the ocean does become rapidly difficult during a storm at sea. The procedure is however very cumbersome and costly.

The techniques which require towing the pipeline encounter all the problems of surface conditions and require the use of lightening or buoying means of substantial dimensions which are therefor difficult to manoeuver.

The process of the invention overcomes the difficulties of the different techniques presently used.

In accordance with the process of the invention, to place a pipeline, designed for the transfer of liquid or gaseous fluids, on the sea floor:

the pipeline is constructed in sections of significant length in a staging or shallow water area, and is provided with spaced apart means for lightening and handling, the pipe is launched in a semi-submersed position, the pipe is submerged to a depth sufficiently below the surface of the water that the effects of surface waves agitation are no longer appreciable, the pipe is towed to and positioned vertically above the planned pipeline route, eventually the pipe is raised near to the surface of the water so that it can be inspected or serviced, in a controlled fashion, the pipe is submerged and placed on the ocean floor, and the buoying and handling means are recovered.

One apparatus according to the invention for placing a pipe for the transfer of liquid or gaseous fluids on the sea floor, comprises a plurality of lightening and handling devices distributed along the pipeline, and is characterized in that the handling means are each supported by at least one lightening means termed a principal float, the handling means are connected to coupling means on the pipeline by at least one cable which is connected by a fastening part. This part is joined to the coupling means by a joint permitting universal movement.

In the embodiments for holding of long spans of large diameter pipeline in high seas, the devices for lightening and for handling comprise in addition, at least one lightening means, called secondary float, having the same axis of symmetry as the handling cable, and resting on the coupling means on the pipeline, and fixed in a removable fashion to the coupling means by a detachable connector means, the secondary float and the primary float including mating engageable parts, male and female, facing each other, so that following the unlocking of the connector means the secondary float can move from a position in which the secondary float is secured to the coupling means on the pipeline to a position in which the secondary float is secured to the primary float by the fitting of the mating adapting parts, the coupling means being joined to the connector means by a universal joint which can be detached.

In one preferred embodiment of such equipment, the handling means are each supported by at least one lightening means, called a primary float, and are joined by coupling means to the pipeline by at least one cable passing through a water and air tight shaft of the primary float.

In the embodiments in which the most extensive recovery of equipment is sought, the devices for lightening and for handling are such that the shaft or passage of the primary float comprises at its lower part a cylindrical opening coaxial with the shaft and whose cross section is greater than that of the shaft and a little larger than the exterior dimensions of a cable cutter, the cable cutter being held in the cylindrical opening by the action of a pivotable support retractable by striking of an annular weight sliding along the cable and released from the surface, the cable cutter having a cylindrical axial opening whose upper part is the same diameter as that of the shaft of the primary float and whose lower part has a larger diameter, the two openings being joined by an annular joining area comprising a release shoulder for releasing a cutting tool of the cable cutter, the shoulder having an exterior diameter slightly larger than the exterior diameter of a control element of the cable cutter which is fixed on the cable at a distance at least equal to the height of the cable cutter.

In the same embodiments the devices for lightening and for holding are such that the part called coupling is of cylindrical form and fits into a cylindrical groove at the lower part of the water and air tight shaft going through the primary float and coaxial with the shaft, and the coupling has an exterior diameter greater than that of the shaft so that the end of the opening of the shaft comprises a stop for the coupling when pulled up by the controlling cable.

BRIEF DESCRIPTION OF THE DRAWINGS

FIG. 1 is a schematic view in front elevation showing a primary float with a pipeline connected to the float and in the towing position;

FIG. 2 is a partial view in section of the lower portion of FIG. 1 and shows the manner in which the pipe is secured to a cable;

FIG. 3 is a bottom view in plan of a portion of the principal float assembly of FIG. 1;

FIG. 4 is a side view in elevation of a pipeline equipped with a primary float and a secondary float with the floats shown in the pipeline launching position;

FIG. 5 is a view in section taken along line 5—5 of FIG. 4;

FIGS. 8–11 are side views in elevation showing schematically the positions of the apparatus with respect to the pipeline, with:

FIG. 8 showing the arrangement according to the invention in the pipe launching position;

FIG. 9 showing the position for towing in calm water;

FIG. 10 showing the position for towing in heavy seas; and

FIG. 11 showing the primary float vertical for handling the pipe, and the secondary float in its recovered position.

FIG. 1 is a view in elevation of an apparatus according to the invention, for lightening and handling a pipeline 1. As shown at FIG. 1, in solid lines, the apparatus is in the usual position for towing the pipeline, and comprises a lightening or buoying means termed a primary float 2, supporting a handling means in the form of a winch 3 having a drum 3'. A cable 4 is wound on the drum 3' of winch 3 and extends through a shaft or passage 5 of primary float 2. This shaft 5 is suitably sealed to be water and air tight. Cable 4 is fastened to a connecting means 6 extending along the axis X—X' of pipeline 1 and which takes the form of a length of tube 6 whose inside diameter is greater than the outside diameter of pipeline 1. Tube 6 is maintained concentric with conduit 1 by an annular insert 7, of concrete, a plastic material, or any other desirable product, as shown at FIG. 2. Insert 7 generally takes the form of a spacer which spaces the tube 6 from the exterior of the pipeline.

Figure 6:
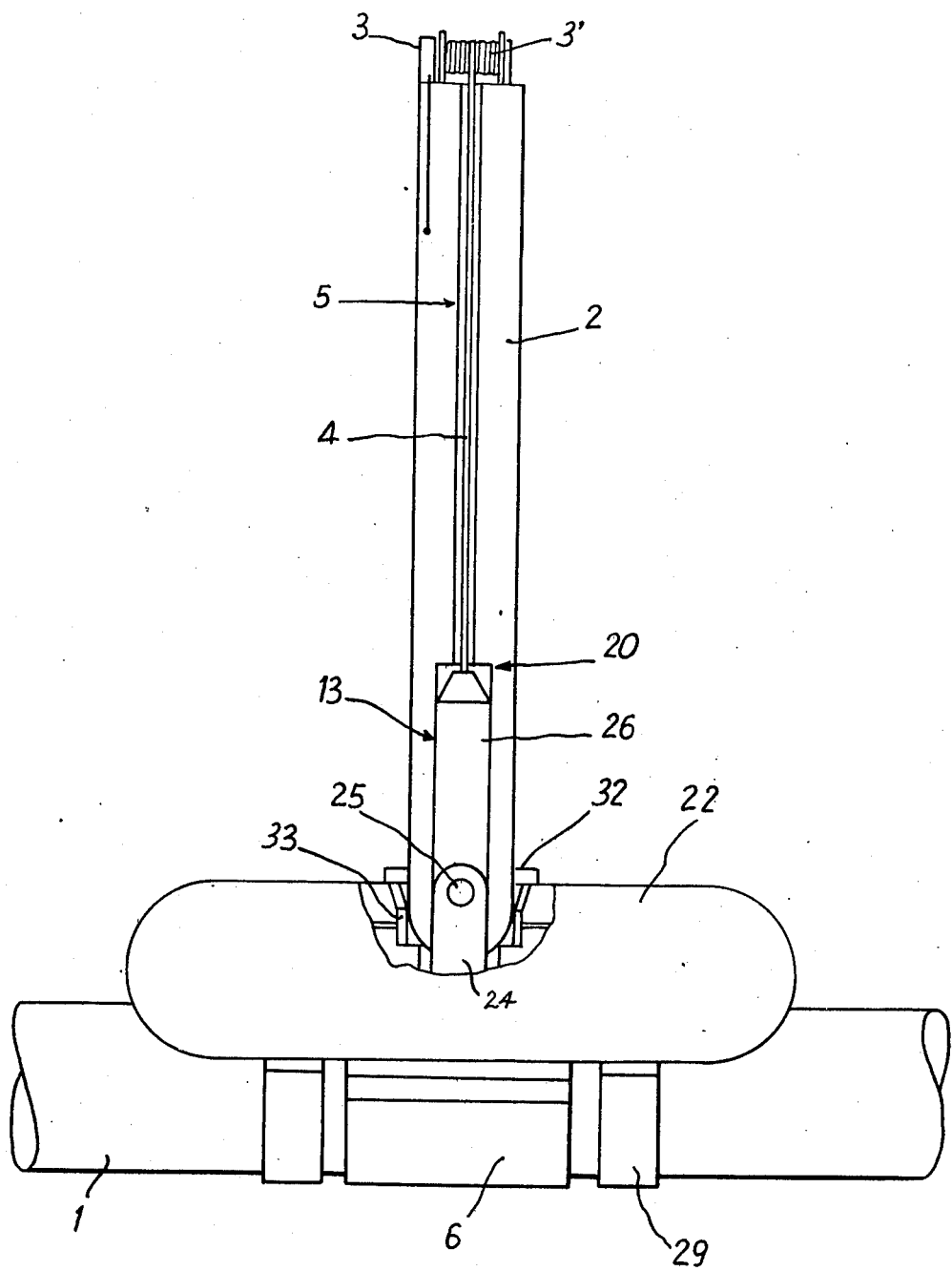
FIG. 6 is a side view in elevation of the apparatus of FIG. 4 showing the principal float and secondary float in the positions they can occupy during towing, in calm water.

At the middle of tube 6, is a double groove, such as that formed by the intersection of two cylinders 8' and 8" (FIG. 1) with axes $Y_1$ and $Y_2$ horizontal and perpendicular to a vertical plane including axis X—X' of the pipeline. The distance between the axes $Y_1$ and $Y_2$ is slightly greater than the diameter of the cylinders 8', 8" and the depth of each groove or indentation is less than the difference between the outside radius of tube 6 and the outside radius of pipeline 1. The axes $Y_1$ and $Y_2$ of cylinders 8', 8" are equally spaced on opposite sides of axis Y—Y' of cable 4.

A round iron bar 9 is secured at its ends to the inside of tube 6, the bar having its axis perpendicular to axis Y—Y' of cable 4.

As shown at FIG. 1, cable 4 is connected to the tube 6 by a generally oval link or ring 10. One end of the ring extends around bar 9, and a loop 11 at the lower end of cable 4 extends through the other end of ring 10. The loop 11 of the cable is fastened by a suitable clamping means such as cable clips 12.

The vertical shaft 5 which extends through the primary float, has at its lower end a cylindrical opening 13 coaxial with the upper portion of the shaft 5. Cylindrical opening 13 has a diameter larger than that of shaft 5, this diameter being also slightly greater than the exterior dimensions of a cable cutter 14 which fits in cylindrical opening 13 as shown at FIG. 1. Cable cutter 14 is maintained in cylindrical opening 13 by a retaining device 15 pivotal about an axis Z—Z' at the bottom of primary float 2, and to one side of opening 13. The retaining device 15 is normally maintained in the position of FIG. 1 by the action of a torsion spring 15", but can be released by striking it with an annular weight 16 which slides along the cable 4 and is dropped from the surface.

Cable cutter 14 has an axial opening or bore 17 whose upper portion 18 is the same diameter as that of shaft 5 of the primary float, and whose middle portion 19 has a diameter greater than the diameter of upper portion 18. The upper and middle portions of the bore are joined by an annular conical shoulder 20 which functions as a release abutment for a cutting tool of the cable cutter. This cutting tool (not shown) is located in the plane P of FIG. 1, the cutting tool and cable cutter being conventional Petroleum Industry equipment.

The annular shoulder 20 has an outside dimension slightly greater than the diameter of a control element 21 for the cable cutter 14. The element 21 is fixed to cable 4 at a distance above ring 10 which is at least equal to the length of the cable cutter body 14.

Cable cutter 14 is shown at FIG. 1 in two positions. In the solid line position, cable cutter 14 is held in the cylindrical opening 13 of the primary float by the retaining device 15. In the phantom line position, the cable cutter is shown supported on control element 21 in the position where the abutment shoulder 20 strikes the control element to release the cutting tool and sever the cable.

As is apparent from FIG. 2, a portion of tube 6 is removed in the region of the bar 9 to accomodate the ring or link 10.

As shown at FIG. 3, which is a bottom view of the cable cutter and its retainer 15, the two arms of the retainer are joined to a shaft on which spring 15" is wound, and end portions 15' of this shaft enable mounting the retainer for pivotal movement.

In the embodiments of FIGS. 4–6, primary float 2 supports a handling or hauling means in the form of a winch 3 with a drum 3' on which cable 4 is wound, the cable 4 passing through a water and air tight shaft 5 of primary float 2. In this embodiment, the cable is again connected to pipe 1 by a coupling assembly in the form of a tube 6 which extends around the pipe in the manner previously described, the arrangement including the annular filler 7. Fixed to the upper portion of tube 6 and projecting upwardly therefrom is a cylindrical body 24 which is joined at a pivot 25 which can be of the universal joint type. The shaft portions of the pivot 25 are secured to a movable cylindrical body 26 which includes an anchoring element and via which the lower end of cable 4 is secured to body 26. The linkage of body 26 to body 24 by the pivot connection 25 is of the detachable type so that body 26 and at least a portion of the pivot can be recovered. Detachment of the pivot connection can be by direct action, for example by a diver, or by remote control.

At the lower end of shaft 5 of the primary float 2 of the embodiments of FIGS. 4–6, there is a cylindrical opening 13 whose diameter is greater than the diameter of shaft 5 so that there is an annular shoulder 20 between the shaft and the opening which constitutes a stop or abutment for limiting movement of body 26 into primary float 2.

There are two cylindrical floats 22 and 23 each of generally cylindrical configuration, and of the same dimensions. The axes of these secondary floats are parallel to the axis of pipe 1, and the floats are joined together by braces 27 which extend between the floats. The floats also have support parts or pads which face downwardly and engage and seat on the upper cylindrical surface of the tube 6. The secondary float assembly also has a removable joining arrangement in the form of two bands 29 secured to the respective floats by a releasable fastener 31, the bands 29 passing under the pipe to securely fasten the float assembly to the pipe. With the fastening devices 31 locked, the float assembly is secured to the pipe at the location of the coupling tube 6.

The secondary floats 22 and 23 and the primary float 2 each have mating engageable parts. As shown at FIG. 6, with primary float 2 upright, its lower end forms the male part, and the socket 33 at the upper portion of the secondary float assembly forms the female part to receive the lower end of the primary float. Correspondingly, it is apparent that the primary float is movable from the towing position of FIG. 4 to the pipe handling position of FIG. 6, after the bands 29 are released, and that in the FIG. 6 position, the lower end of primary float 2 seats in and mates with the socket 33 of the secondary float assembly.

In FIG. 4, the primary float 2 has its axis parallel to the axis of pipeline 1 and rests on the pipe via a support 34. The primary float is held in this position with respect to the pipeline by a removable band 35. The band 35 is used during launching of the pipeline in the assembly area.

In FIG. 6, the primary float has been released from the pipeline and has been moved to its vertical position in which its axis is perpendicular to the axis of the pipeline. In this position, tension is maintained in cable 4 so that body 26 abuts shoulder 20 at the upper end of opening 13. As is apparent, in this position, the primary float 2 rests on the secondary float assembly, and the mating portions 32 and 33 of the primary float and secondary float assembly are in contact. It is preferred that a locking system be provided to secure the primary float to the secondary float assembly when the primary float is in its upright position. The primary float is disposed in this upright position for towing in high seas and heavy water.

Figure 7:
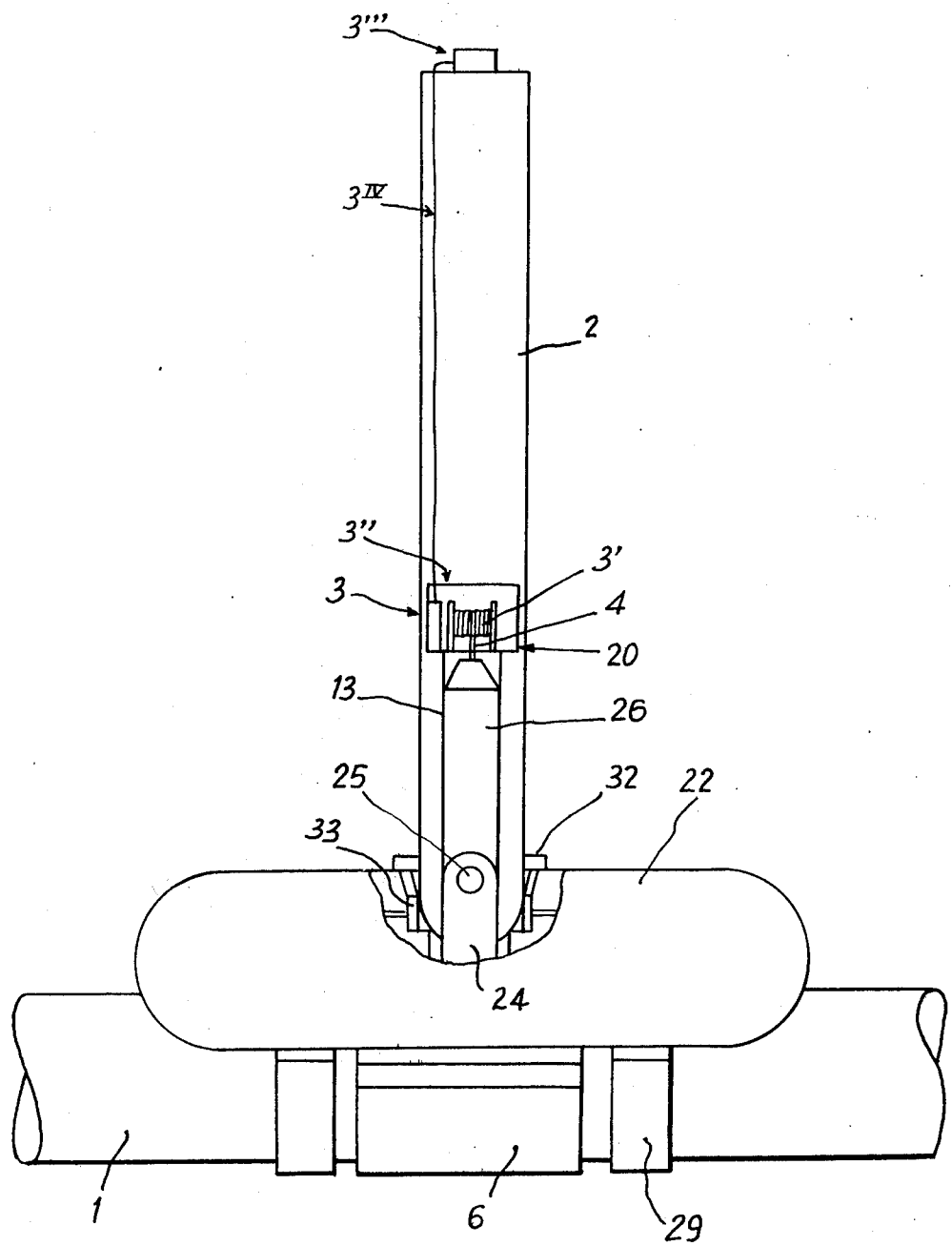
FIG. 7 is an elevational view of a variation of the arrangement of FIG. 6.

FIG. 7 shows a variation of the embodiment of FIGS. 4-6. In the arrangement of FIG. 7, the principal float 2 supports the holding or hauling means, again in the form of a winch 3 with a drum 3' on which cable 4 is wound. In this embodiment, however, the winch and its driving motor are placed in a water and air tight chamber 3" disposed as low as possible in float 2. FIG. 7 shows the chamber 3" situated immediately above cylindrical opening 13 which receives body 26.

Winch 3 is controlled by control means 3''' placed on an upper end or platform of primary float 2 by means of an encased electric cable 31V preferably passing through the inside of the float, but which can also be held to the outer wall of the float.

The embodiment of FIG. 7, because of its lower center of gravity when in the upright position as shown, has the advantage over the embodiment of FIG. 6 of a better stability of the primary float. The embodiment of FIG. 7 would be preferred when towing pipe in constantly heavy seas and submerging the pipe in regions where there is significant surface wave motion. It is of course necessary then to assure complete water tightness of the electrical equipment associated with the winch.

The operation of placing pipe on the ocean floor, using this invention will now be described.

First, one selects either the primary float arrangement of FIG. 1 or an arrangement including both primary floats and secondary floats, depending on the dimensions of the pipeline to be handled and other factors such as the water depth and the ocean conditions.

With the apparatus of FIGS. 4-7, the launching is done with the pipe on or close to the surface as shown. The pipeline is first constructed in the assembly area, and is launched, the primary float at this time being in a horizontal position. The primary float is bound to the pipeline, for example, by band 35 as shown at FIG. 4, and the winch cable is tightened to provide sufficient tension so that the float is firmly against the upper portion of tube 6.

The towing of course can be done on the surface with the primary float in its horizontal position, when operating in calm seas as shown in FIG. 8. In rough water, the primary float is moved to its vertical position of FIG. 9 in which the pipeline and secondary floats are each submerged so as not to be affected by wave action.

As shown at FIG. 9, the primary float is in its vertical position and the secondary floats are joined to the pipe. The extent of immersion for towing is variable, but is of course limited by the depth to which the secondary floats can safely be lowered.

As shown at FIG. 11, the primary float is in its vertical position and the secondary floats, previously disconnected from the pipe, are butted against the primary float. The pipeline can thus be positioned right on the location or site of its intended use.

After towing to the desired site, the secondary floats may still be connected to the pipeline and submerged, or alternatively they may have been disconnected during the former maneouvers.

In the situation where the secondary floats are still secured to the submerged pipe, one first raises the pipeline and the secondary floats, and then, the connectors between the secondary float assembly and the pipeline (bands 29) are released. After release of these bands, one proceeds to lower the pipeline in the manner shown at FIG. 11 by controlling the several winches of the various primary floats so that a very controlled immersion of pipeline is achieved and the pipeline is placed at its precise predetermined position on the ocean floor.

However, before submerging the pipe to its intended position, it is desirable to connect pulling devices such as ship connected cables to the extremities of the pipeline to permit its precise positioning on the ocean floor.

When the pipeline is lowered to its position on the ocean floor, the devices which hold the body 26 to the body 24 of the coupling tube 6 are released, and most of the equipment is recovered. As previously mentioned, such release of the equipment for recovery can be by diving apparatus, which can be raised with the cable, or by submarine. In certain instances it may be desirable to simply cut the cable with a cutting arm of a submarine.

When the embodiment of the apparatus of FIGS. 1-3 is used, the recovery of the cable is accomplished by dropping the cable cutter from the surface. This is of course the easiest and least expensive recovery process.

As is apparent from the above description, the advantages of the process of this invention are numerous, and are attained principally by the flexibility of use of this technique and apparatus. Because of the varied nature and dimensions of the materials to be placed and the varied nautical conditions which can be encountered, this flexibility is very desirable.

The devices for lightening and handling can be used rapidly and easily in various situations. In addition, expense is reduced since almost all the equipment is recovered.

What is claimed is:

1. Apparatus for positioning on the sea floor, a pipeline for the transfer of liquid or gaseous fluids, comprising a plurality of lightening and handling devices distributed along the pipeline, each of said handling devices being supported by at least one lightening means comprising a primary float, a coupling means on the pipeline, a cable on the handling means, a pivotal connector connected between the coupling means and the cable, at least one additional lightening means comprising a secondary float, said secondary float having the same axis of symmetry as the handling cable, said coupling means on the pipe presenting a seat, and said secondary float resting on the coupling seat, means releasably connecting the secondary float to the coupling means, said secondary float and primary float comprising male and female engaging sections, so that the secondary float after release from the coupling means of the pipeline, can be engaged with the mating parts of the primary float and secured thereto to provide a single assembly.

2. Apparatus according to claim 1 wherein said primary float has a water and air tight shaft therein, and said cable extends through said shaft.

3. Apparatus according to claim 1 which further comprises, a cable cutter having a cylindrical body, said primary float having at its lower end, a cylindrical opening coaxial wih the shaft in the float, and of a greater diameter than said passage and slightly larger than the exterior of the cable cutter, retaining means for retaining the cable cutter within said cylindrical opening, the retaining means including a support for the cable cutter body pivotal about an axis, said cable cutter having an axial opening presenting a downwardly facing annular shoulder for releasing a cutting tool of the cable cutter, stop means secured to the cable above the coupling means on the pipeline at a distance at least equal to a vertical dimension of the cable cutter, and retainer release means slidable along the cable and releasable from the surface, to release the cable cutter from the primary float.

4. Apparatus according to claim 1 wherein said coupling means includes an upright cylindrical part, said primary float has a cylindrical opening at its lower end and a shoulder in the opening, said shoulder forming an abutment for engaging said cylindrical part of the coupling means when lifted against the float by said cable.

* * * * *